(No Model.)

J. SPYER.
RUBBER DENTAL PLATE BLANK.

No. 527,817. Patented Oct. 23, 1894.

Witnesses:

Inventor.
Joseph Spyer.
by his
Attorneys

UNITED STATES PATENT OFFICE.

JOSEPH SPYER, OF MEXICO, MEXICO.

RUBBER DENTAL-PLATE BLANK.

SPECIFICATION forming part of Letters Patent No. 527,817, dated October 23, 1894.

Application filed July 5, 1894. Serial No. 516,603. (No specimens.)

*To all whom it may concern:*

Be it known that I, JOSEPH SPYER, a citizen of the United States, residing at the city of Mexico, in the Republic of Mexico, have invented certain new and useful Improvements in Rubber Blanks for Dental Plates; and I do hereby declare the following to be a full, clear, and exact description of the invention, such as will enable others skilled in the art to which it appertains to make and use the same.

This invention is a soft rubber "blank" to be used in the manufacture of dental plates.

Heretofore in constructing dental plates the flask was heated to drive all the wax out. Scrap rubber was then cut up into a number of very fine pieces, and all these pieces heated to a certain temperature. The rubber thus heated was then packed piece by piece into the heated flask and then after the entire flask was packed the packed mass was vulcanized to make a dental plate. The objections to this method are that a great deal of time is consumed in heating the flask and rubber, and it usually takes from six to eight hours to pack the flask with the small pieces. Besides this the operation is accompanied by considerable dirt and the operator's hands are unavoidably stained from the operation. Then again it is very difficult to prevent the red or pink and black rubbers mixing with each other and producing a mottled appearance.

The object of this invention is to avoid all these objections and this I do by providing a soft rubber "blank" molded by pressure with or without heat into a form and size approximate to the bases of the upper and lower dentures so that one of my "blanks" can be placed in a mold and a dental plate produced therefrom without the time taking intermediate steps.

My invention consists also of the novelties of construction hereinafter described and claimed.

Figure 1:
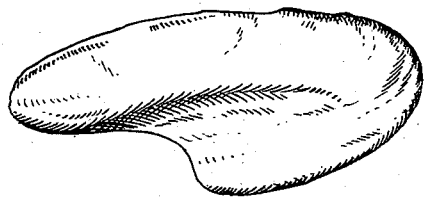
Figure 2:
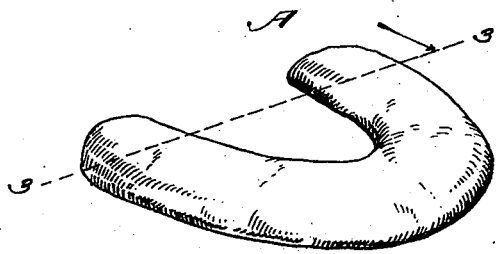
Figure 3:
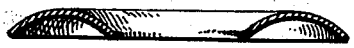

In the drawings hereunto annexed, Figure 1 shows a "blank" adapted for making an upper plate; Fig. 2, one adapted for forming the lower plate, and Fig. 3 is a sectional view of upper plate blank.

In carrying out my invention I make a soft rubber "blank" A for the upper or lower denture as desired. The "blanks" are molded by pressure with or without heat and in size and shape approximate the bases of the upper and lower dentures and they are intended to be sold to dentists so that when they prepare their plates this "blank" is employed and all the time taking intermediate steps are dispensed with such as the necessity for heating the flasks, preparatory to packing, the cutting of the rubber into minute pieces, and the heating of rubber to be employed, and the possibility of the black and red gum used in the plate running into the pink of the gum is also avoided. The "blanks" being also of uniform thickness, the resultant plates will be of uniform thickness and the labor of polishing and finishing is lessened. Although these "blanks" can be made in plaster or metal molds, I prefer to make them in the metal and I also prefer to use twenty-four parts of sulphur and twenty-four parts of rubber, and dissolve the same in bisulphide of carbon, together with the necessary coloring matter. The composition is then run or pressed into the molds with or without heat thereby giving the necessary shape to the "blanks." The "blank" thus comes from the mold as a soft rubber "blank" which is sold to dentists and used by them without any further preparation, in the manufacture of dental plates, and the manner of use is as follows: After the case has been flasked, the flasks separated and the wax removed, the "blank" is placed on the model, the flasks closed and placed in boiling water for several minutes as is ordinarily done in order to close them. The flasks are then pressed together and it is ready for vulcanizing.

Having thus described my invention, what I claim, and desire to secure by Letters Patent, is—

A soft rubber blank adapted for use in making artificial dentures, which soft rubber blank is of the size and shape of the denture and is adapted to be shaped in any suitable manner and vulcanized, substantially as described.

In testimony whereof I affix my signature in presence of two witnesses.

JOSEPH SPYER.

Witnesses:
WALTER B. MURRAY,
A. C. VERDUGO.